May 14, 1940.  G. D. HUFF  2,200,421
ROTARY FILE
Filed July 21, 1939  2 Sheets-Sheet 1
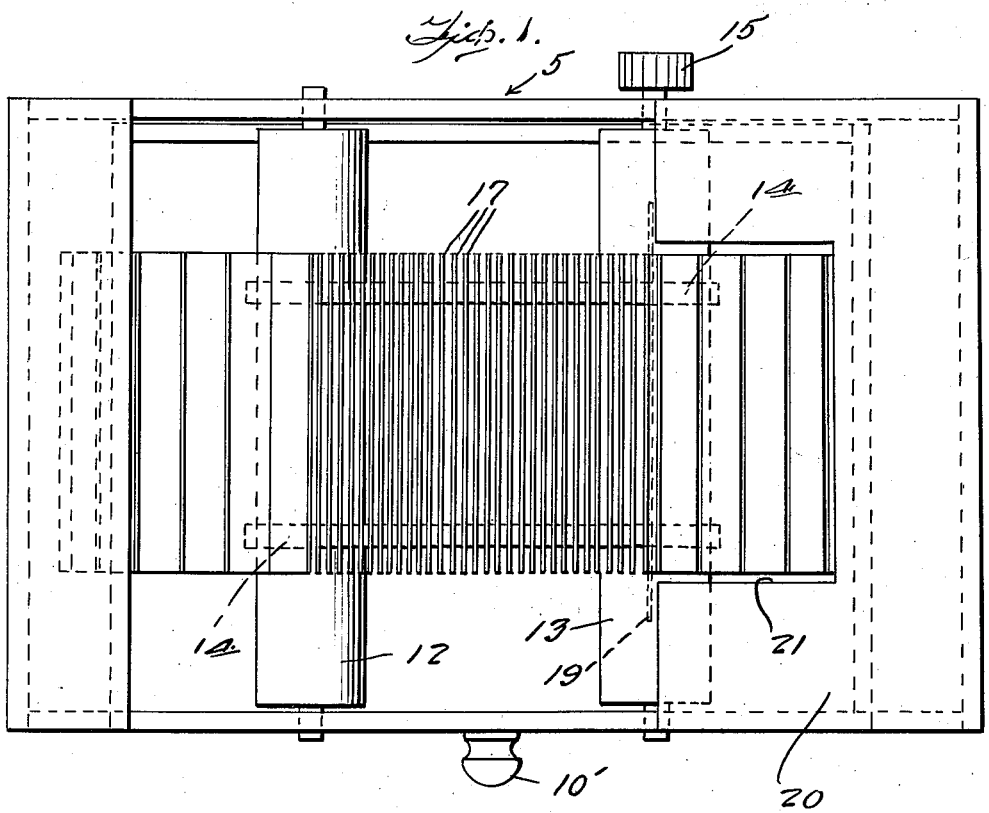
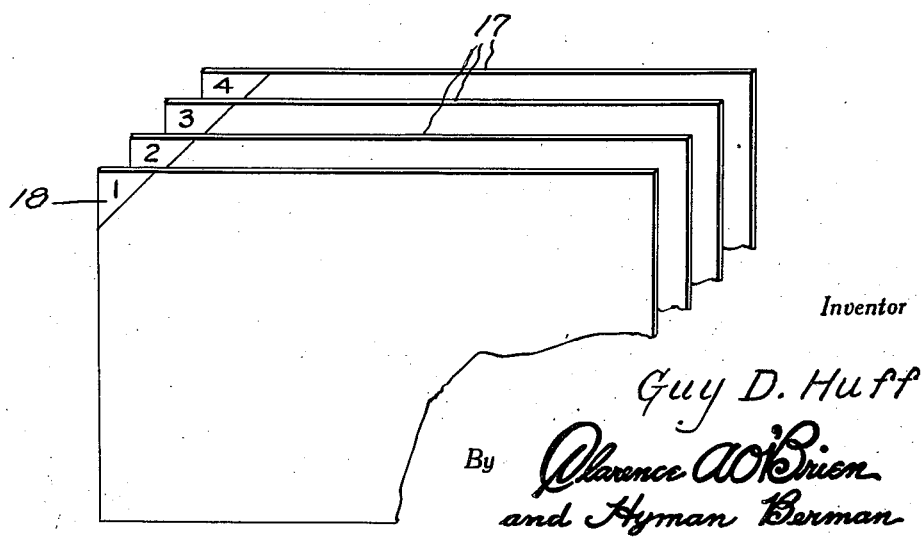
Inventor
Guy D. Huff
By Clarence A. O'Brien
and Hyman Berman
Attorneys May 14, 1940.  G. D. HUFF  2,200,421
ROTARY FILE
Filed July 21, 1939   2 Sheets-Sheet 2

Inventor
Guy D. Huff

By Clarence A. O'Brien
and Hyman Berman
Attorneys

Patented May 14, 1940

2,200,421

UNITED STATES PATENT OFFICE 2,200,421

ROTARY FILE

Guy D. Huff, Plus, W. Va.

Application July 21, 1939, Serial No. 285,784

5 Claims. (Cl. 129—2)

This invention relates to devices generally known as files for use in filing away certain matter for future reference purposes, and an object of the invention is to provide a device of this character which can be simply and economically constructed and which will be found useful by small business establishments and individuals for filing away matter in such a manner that the same may be readily brought to the attention of the user on a predetermined day.

The invention together with its objects and advantages will be best understood from a study of the following description taken in connection with the accompanying drawings wherein:

Figure 1 is a top plan view of the file in open position.

Figure 3 is a fragmentary perspective view showing some of the leaves forming part of the file.

Figure 2:
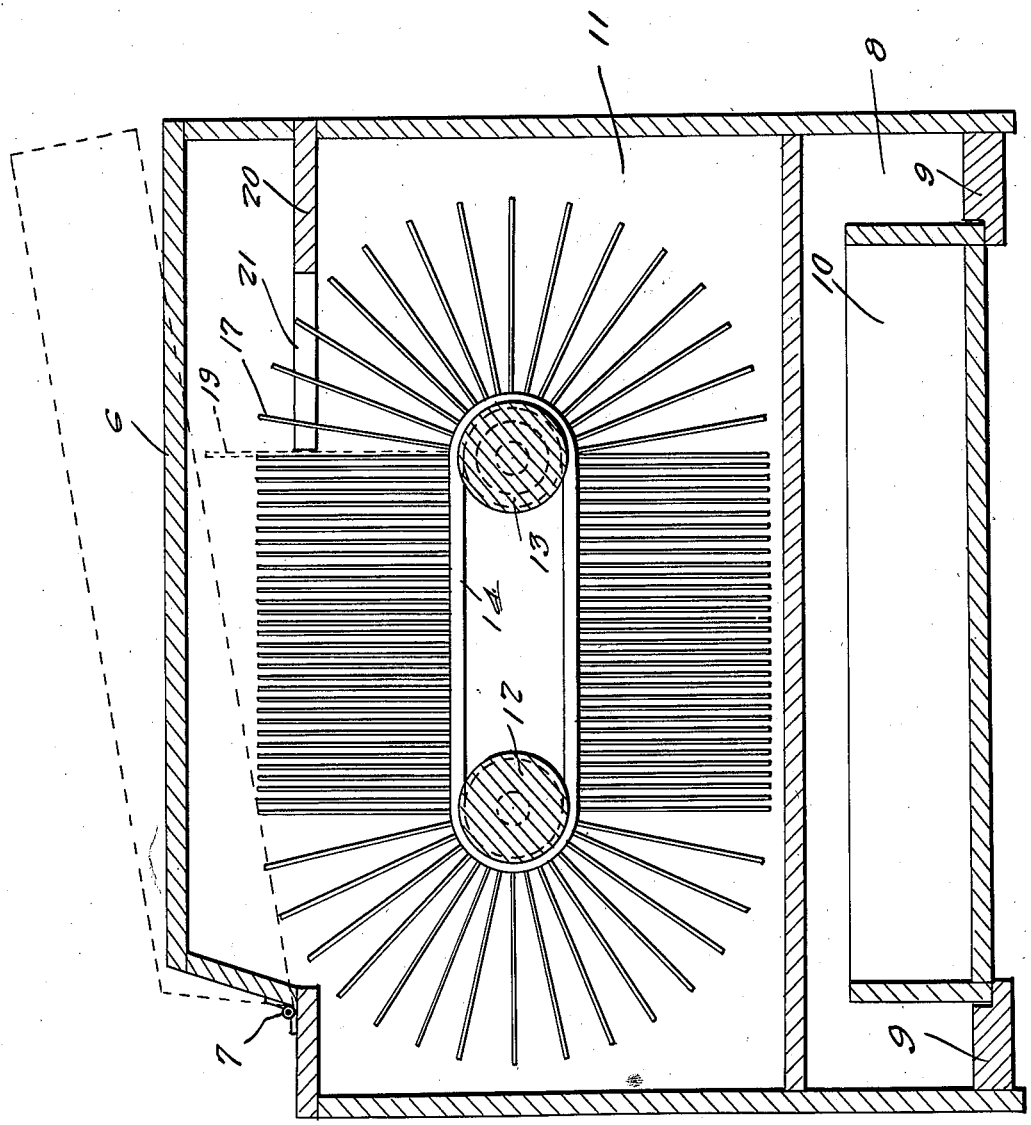
Figure 2 is a vertical sectional view through the file.

Referring more in detail to the drawings it will be seen that in the preferred embodiment thereof the file comprises a cabinet 5 of any suitable shape and design.

The cabinet 5 is open at the top thereof and for the top of the cabinet there is provided a lid or closure 6 hinged to the cabinet as at 7.

In the lower portion thereof the cabinet 5 is provided with a compartment 8 equipped with rails 9 for supporting a drawer 10 to be used for the storage of envelopes, stamps and the like.

The compartment 8 opens laterally of the cabinet 5 at one side thereof whereby access to the drawer may be readily had. The drawer 10 is provided with a conventional knob 10'.

In the upper portion thereof the cabinet 5 is provided with a compartment 11 in which is arranged a rotary filing device.

The aforementioned rotary filing device comprises a pair of rollers 12 and 13 suitably journalled within the compartment 11, and trained over the rollers are V belts 14 that have suitable frictional engagement with the rollers 12 and 13 and upon rotation of the roller 13 said belts 14 will be caused to move over the rollers.

The roller 13 is provided on one end thereof with a knob 15 disposed exteriorally of the cabinet 5 and provided to facilitate the turning of the roller and consequently the movement of the belts 14.

Secured to the belts 14 is a plurality of leaves 17 which may be made of metal, cardboard, or other suitable relatively stiff material.

The leaves 17 may be consecutively numbered as at 18, and as shown in Figure 3, or arranged in alphabetical form as may be desired, and are adapted to accommodate therebetween the filed work 19, which may be a letter, memorandum card, or the like.

The cabinet 5 at the top of the compartment 11, and the front side of the cabinet is provided with a transverse shelf 20 that in its free edge is provided with a notch 21 to permit the leaves 17 to clear the shelf 20, with the inner edge of the shelf 20 at opposite sides of the notch 21 serving as a stop against which the filed work 19 will abut to prevent further movement of the belts 14.

Preferably instead of using a single broad endless belt, two relatively narrow laterally spaced belts 14 are employed as shown in Figure 1. Further, preferably 93 leaves 17 are mounted on the belt, the leaves being divided in groups, each group numbering 31 leaves, and the leaves of each group being numbered consecutively, 1 to 31.

In the contemplated plan of use only the leaves on the upper runs of the belt will be employed, and these leaves will embody one full complete group of 31 leaves, there being at least one leaf for each day in the month. By such an arrangement, if the filing device is used daily, only four complete revolutions a year will be required.

As shown in Figure 2, by placing the letter or other filed work 19 behind the number 1 leaf 17 of the group, said work 19 will abut the inner edge of the shelf 20 and prevent rotation of the filing device.

The utility of a file of this character will be apparent from the following example:

Let it be assumed that bills or statements are received on the first day of the month and these papers are placed between the leaves of the device in accordance with the days on which they are to be attended to. For instance, a bill due on the 15th of the month would be placed between the leaves numbered 15 and 16 and that due on the 3rd of the month between the leaves numbered 3 and 4, it being understood that on the first of the month the leaf numbered 1 would be resting against the stop or shelf 20. Each day the device is turned to bring a new leaf at the free edge of the shelf or a paper placed between said leaf and the next one against the edge of the shelf. Of course, before the device is turned this paper is removed and attended to or refiled so that the device can be moved one leaf. This is done every day to bring a current leaf at the edge of the shelf and then when the leaf carrying the bill due on the third day is moved to the edge of the shelf this bill, of course, is at hand and the user will know that the bill is due that day.

Other uses will readily present themselves to those skilled in the art.

It is also contemplated that the file be made in different sizes, as for example, a standard size; a larger size for business correspondence; and a third size which would be the smallest size and suitable for filing articles of the size of memorandum or calling cards.

Also the cabinet may be made of any desired material and in various colors to match various colors of office furniture.

It is thought that a clear understanding of the construction, utility and advantages of a filing device of this character will be had without a more detailed description.

Having thus described the invention, what is claimed as new is:

1. In a filing device of the character described, a cabinet open at the top thereof, a pair of spaced apart rollers journalled transversely in said cabinet, endless belt means trained over said rollers, a plurality of filing leaves secured to said belt means to move therewith and to receive matter to be filed therebetween and stop means in the cabinet for engaging matter filed between the leaves for preventing movement of the belt means until such matter is removed.

2. In a filing device of the character described a cabinet open at the top thereof, a pair of spaced apart rollers journalled transversely in said cabinet, endless belt means trained over said rollers, and a plurality of filing leaves secured to said belt means to move therewith, a shelf mounted transversely in the cabinet adjacent one end thereof, said shelf being provided with a notch in the free edge thereof to accommodate said filing-leaves and said shelf adapted to be abutted by work filed between said leaves and of a size larger than the leaves for retarding movement of said belt means and associated filing-leaves.

3. In a filing device of the character described, a cabinet open at the top thereof, a pair of spaced apart rollers journalled transversely in said cabinet, endless belt means trained over said rollers, and a plurality of filing leaves secured to said belt means to move therewith, a shelf mounted transversely in the cabinet adjacent one end thereof, said shelf being provided with a notch in the free edge thereof, to accommodate said filing-leaves and said shelf adapted to be abutted by work filed between said leaves and of a size larger than the leaves for retarding movement of said belt means and associated filing-leaves, one of said rollers being equipped with a knob exteriorly of the cabinet to facilitate rotation of the rollers to cause said belt means and associated leaves to travel within said cabinet.

4. In a filing device of the character described, a cabinet open at the top thereof, a pair of spaced apart rollers journalled transversely in said cabinet, endless belt means trained over said rollers, and a plurality of filing leaves secured to said belt means to move therewith, a shelf mounted transversely in the cabinet adjacent one end thereof, said shelf being provided with a notch in the free edge thereof, to accommodate said filing-leaves and said shelf adapted to be abutted by work filed between said leaves and of a size larger than the leaves for retarding movement of said belt means and associated filing-leaves, one of said rollers being equipped with a knob exteriorly of the cabinet to facilitate rotation of the rollers to cause said belt means and associated leaves to travel within said cabinet, said cabinet provided with a hinged cover for the top thereof.

5. In a filing device, a cabinet, a pair of spaced rollers journaled transversely in said cabinet, said rollers being arranged in a horizontal plane, endless belt means passing over said rollers and providing upper and lower horizontal portions, leaf members each having one end edge connected to the belt means and said leaf members being adapted to receive between them matter to be filed, a projecting part in the cabinet extending to a point above one of the rollers and having a notch therein for the passage of the leaf members as the leaf members start to pass around said roller, the notched edge of said member acting as stop means for the matter filed between the leaves to prevent movement of the belt means and leaves until such matter is removed.

GUY D. HUFF.